UNITED STATES PATENT OFFICE.

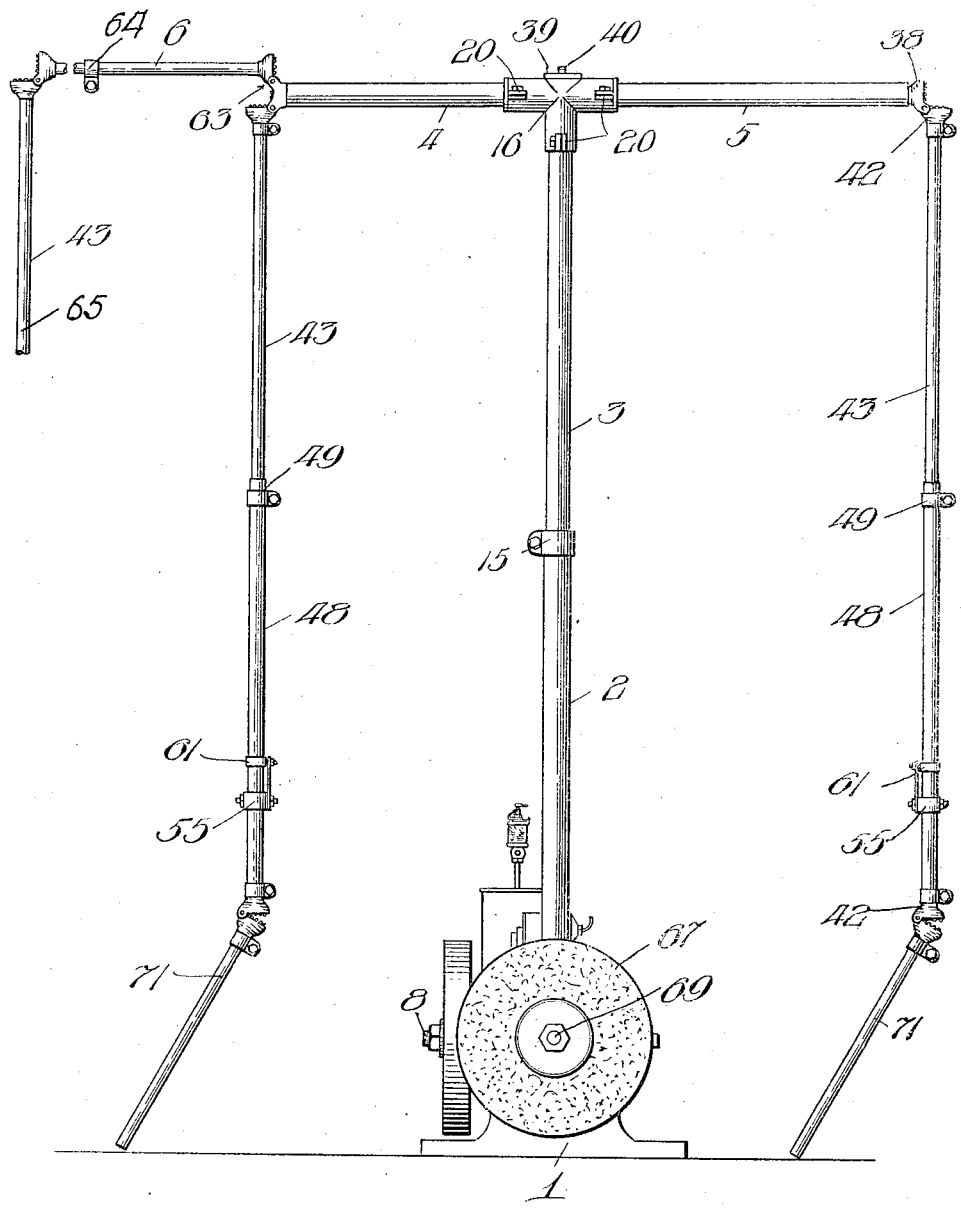

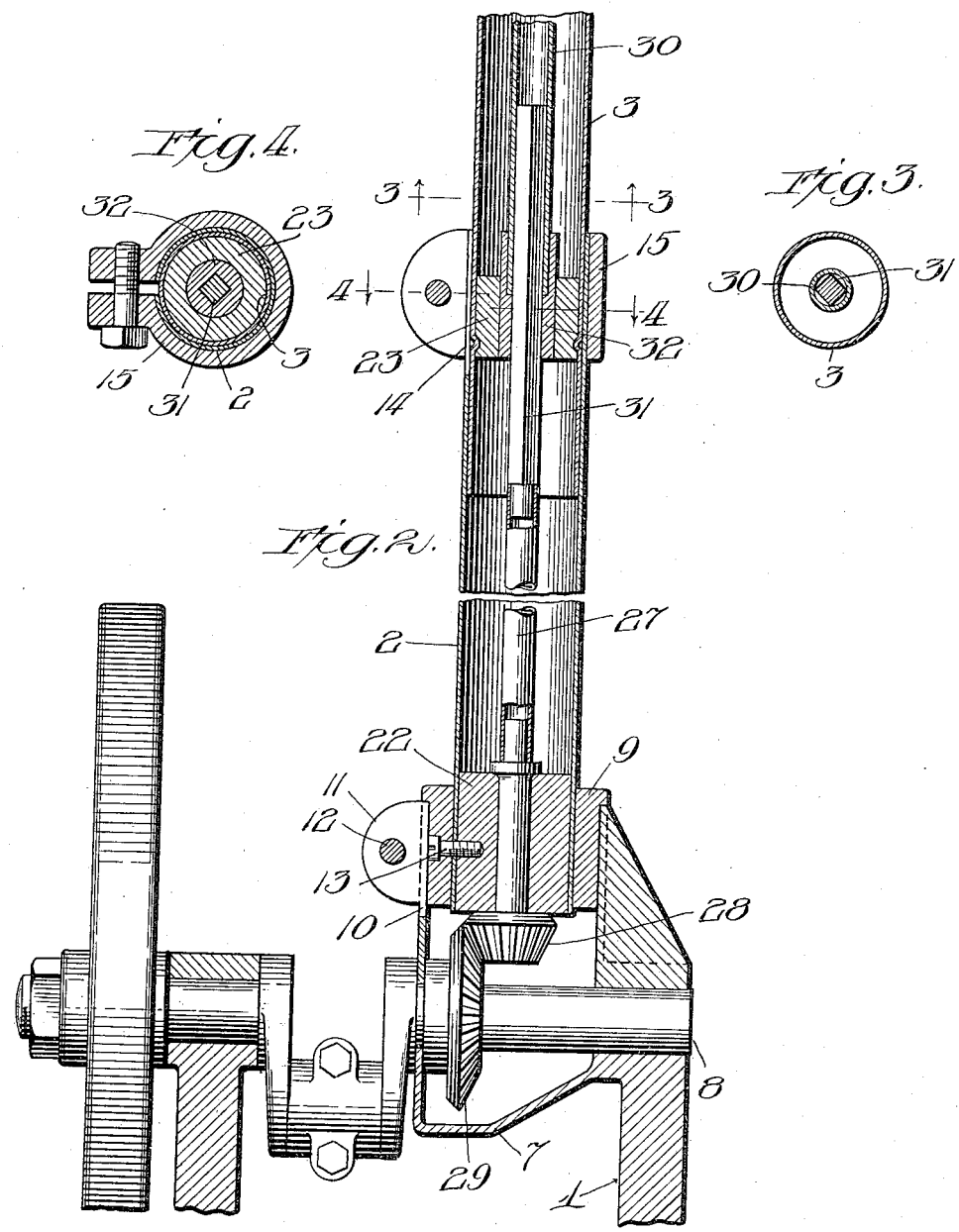

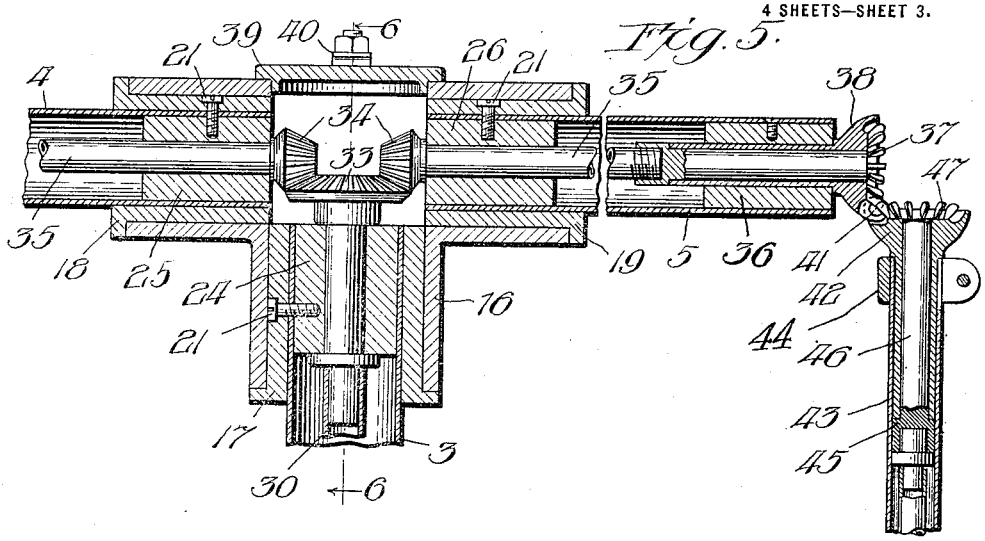
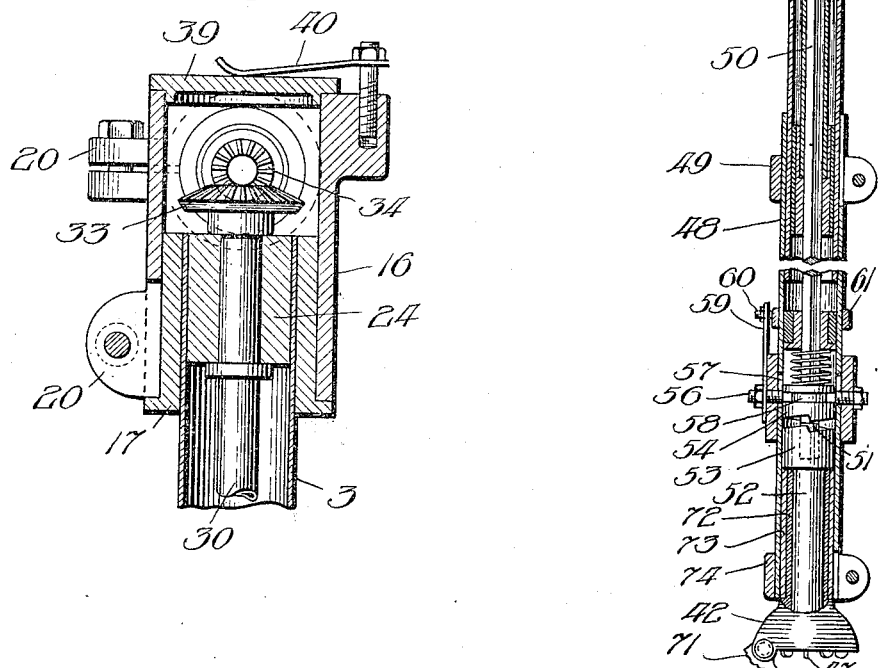

GUSTAV A. GILBERTSON, OF BENSON, MINNESOTA.

POWER-TRANSMITTING MECHANISM.

1,219,545.  Specification of Letters Patent.  Patented Mar. 20, 1917.

Application filed March 13, 1916. Serial No. 83,999.

*To all whom it may concern:*

Be it known that I, GUSTAV A. GILBERTSON, a citizen of the United States, residing at Benson, county of Swift, State of Minnesota, have invented a certain new and useful Improvement in Power-Transmitting Mechanism, and declare the following to be a full, clear, and exact description of the same, such as will enable others skilled in the art to which it pertains to make and use the same, reference being had to the accompanying drawings, which form a part of this specification.

Considered in one of its aspects my invention may be regarded as relating to the art of shearing sheep and to have for its object to produce a simple, compact, self-contained power-driven apparatus of great flexibility and having a wide range of adjustment.

Viewed in another of its aspects my invention may be regarded as relating to a self-contained power plant having upright transverse and drop shafts which are both adjustable and extensible.

Viewed in another of its aspects my invention may be regarded as comprising a simple and novel construction by means of which the actuation of a sheep shearing device will be controlled by a clutch in the drop shaft.

Viewed in another of its aspects my invention may be said to comprise a power plant in which the gas engine or other motor serves as a base for supporting a series of shafts including elevated horizontal shafts and drop shafts.

Viewed in another of its aspects my invention may be said to have for its object to produce a simple and compact sheep shearing power plant in which the gas engine or other motor serves as a base or support for any desired number of sheep shearing units and also as a support for a grinder.

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is an elevation of a sheep shearing plant arranged in accordance with a preferred form of my invention;

Fig. 2 is a vertical section on an enlarged scale through the upper portion of the engine and the lower portion of the upright or standard on which the rest of the apparatus is carried;

Fig. 3 is a section taken approximately on line 3—3 of Fig. 2;

Fig. 4 is a section taken approximately on line 4—4 of Fig. 2;

Fig. 5 is a section on the same scale as Fig. 2 through the upper portion of the upright or standard, a portion of the elevated transverse members, and one of the drop members;

Fig. 6 is a section taken approximately on line 6—6 of Fig. 5;

Reference being had to the drawings, 1 represents an engine or motor of any suitable construction, it being in the arrangement illustrated a horizontal gas engine. Extending upwardly from and supported by the engine frame is a tubular standard comprising a lower member, 2, and an upper member, 3, which are telescoped within each other so as to permit the height of the standard to be varied. At the upper end of the standard are tubular cross arms, 4 and 5, from which depend drop members and which may be continued in both directions for any distance by means of auxiliary horizontal arm extensions such as indicated at 6.

Figure 8:
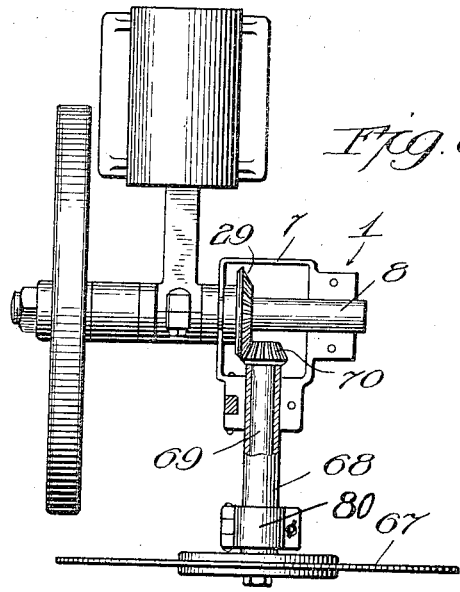
Fig. 8 is a top plan view of the engine with parts omitted to show the means of supporting and driving the grinder.

The manner of supporting the standard or upright from the engine frame is best illustrated in Figs. 2 and 8. The frame is formed with a shell or pocket, 7, through which a portion of the crank shaft, 8, of the engine extends. The upright is closed at the bottom and open at the top, being preferably cylindrical in shape throughout its upper portion. In the top of the pocket is set a bushing, 9, flanged so as to limit its downward movement into the pocket. The bushing may conveniently be held in place by forming in one side of the pocket a vertical slit, 10, bounded by ears, 11, through which a clamping bolt, 12, passes. The bushing is bored out so as to fit upon the lower end of the lower member, 2, of the standard and it may be fastened thereto by means of a screw, 13, or otherwise. This particular arrangement is of value in that it permits, by substituting one bushing for another, the use of a standard of any desired diameter. The upper end of the member 2 may be provided with a vertical slit, 14, and be surrounded by a suitable clamping band, 15, by means of which the member 2 may be firmly clamped about the lower end of the member 3 in any desired telescopic relation with respect to each other. At the top of the member 3 is a T-shaped casting, 16, somewhat similar to a T used in pipe fitting. In order that the members 3, 4 and 5 may be made of any desired diameter, the three arms of the T are preferably bushed as indicated at 17, 18 and 19; these bushings being similar to the bushing 9. The outer ends of the three arms of the member 16 are preferably slit and provided with clamping ears, 20, by means of which the bushings may be firmly clamped in place. The members 3, 4 and 5 fit into their respective bushings and may be held in place by means of screws, 21, passing through the corresponding bushings and into said members, or otherwise. In the lower end of the member 2 is a plug or bearing block, 22. A similar plug or block, 23, is arranged in the lower end of the member 3 while other plugs or blocks, 24, 25 and 26, are arranged in the upper and inner ends of the members 3, 4 and 5, respectively. The blocks or plugs, 22, 24, 25 and 26 may conveniently be secured in place by means of the screws 13 and 21.

Located axially of the upright or standard is a shaft which is made telescopic so as to be automatically lengthened and shortened as the main upright or standard is lengthened or shortened. In the arrangement shown, the lower half, 27, of the shaft is revolubly supported in the plug or bearing block, 22, and held against axial movement in the block. On the lower end of the member 27 is a bevel pinion, 28, meshing with a bevel gear wheel, 29, on the crank shaft. Thus the upright shaft is driven from the crank shaft by gearing which lies within the pocket or casing, 7, which may be filled with oil or other lubricating material so as to insure smooth noiseless running. It will now be seen that the bushing, 9, has another function in addition to that of making it possible to fit a standard of any desired size in the socket or seat. As long as the pinion, 28, is smaller in diameter than the standard, it can be lifted out of place through any opening in which the standard may be seated. However, if for any reason it should be desired to have a pinion larger in diameter than the lower end of the standard, the bushing provides means for removing the pinion with the standard and without disconnecting it from its shaft. The bushings, 17, 18 and 19, serve the same functions as the bushing, 9, permitting the beveled wheels, 33 and 34, to be made either larger or smaller in diameter than the supporting standard or arms. The upper half, 30, of the main upright shaft is made in the form of a tube revolubly supported at its lower end in the bearing block or plug, 23, and telescoped upon the upper end of the shaft, 27. The telescoping portions of the shafts 27 and 30 are so arranged that the two members are required to rotate with each other but are free to move relatively in the axial direction. This may conveniently be accomplished by making the upper end of the shaft 27 square or of some other non-circular shape as indicated at 31 and either giving the tubular member, 30, a corresponding cross section or securing on the lower end thereof a sleeve, 32, properly shaped to fit about the part 31 and form a driving connection therewith.

The upper end of the shaft member, 30, projects through and is supported by the bearing block or plug, 24, flanges or other means being provided to hold the shaft against axial displacement. In the extreme upper end of the shaft member 30 is a bevel gear, 33, meshing with pinions, 34, on the inner ends of suitable shafts, 35, extending horizontally through the arms 4 and 5. The shafts, 35, are revolubly supported at their outer ends in bearing blocks, 36, secured in the outer ends of the arms 4 and 5. In the arrangement illustrated, each of the shafts 35 has on its projecting end one member, 37, of a universal gearing of well known construction; the member 37 and the adjacent portion of the supporting shaft being surrounded by a tubular casing, 38, to which may be hinged one or more similar casings for the purpose of producing drop connections or lateral extensions.

To give access to the gears 33 and 34 and to provide means for introducing a lubricant, I form an opening in the center of the top of the T-shaped casting 16 in registration and close this opening by means of a detachable cover, 39, which may conveniently be held in place by a spring finger, 40, or other suitable means. The gears are therefore housed within a chamber which may be filled with a lubricant. One of the complete drop shafts or connections is illustrated in Fig. 5. Referring to this figure, it will be seen that hinged to the tubular casing, 38, for the gear wheel, 37, as indicated at 41, is a casing, 42, similar to the casing 38. The stem portion of the casing 42 is secured in any suitable way in the upper end of a tube, 43. This attachment may take any form. In the arrangement shown, I split the upper end of the tube 43 and clamp it around the stem of the casing or housing, 42, by means of a clamping band, 44. A shaft, 46, is arranged axially within and extends through the casing or housing, 42, and carries at its upper end a bur-like gear member, 47, meshing with and complementary to the member 37.

On the lower end of the tube, 43, is telescoped a lower tubular member, 48, which may be attached by means including a clamp, 49, in just the same way that the members 2 and 3 of the main upright or standard are attached together. Furthermore, the lower portion of the shaft, 46, is preferably made tubular and surrounds a non-circular shaft member, 50, projecting upwardly into the same from the lower tube 48. The connection between the shaft members 46 and 50 may be the same as between the shaft members 27 and 30, or take any other suitable form, which will permit the composite shaft to be lengthened and shortened as the composite tube comprising the members 43 and 48 is lengthened or shortened.

Upon the lower end of the depending swinging and, if desired, swiveled drop tube is attached any usual shearing device. It is necessary that some means be provided for controlling the operation of each shearing device independently of the others and, in accordance with one feature of my invention, I have provided a clutch near the lower end of each drop shaft where it will be within easy reach of a workman who can instantly interrupt or make the driving connection. In the arrangement illustrated, the entire shaft, 50, except the extreme lower end, 51, which is cylindrical, is made non-cylindrical. The cylindrical portion, 51, is journaled in the upper end of the immediate driving device, 52, for the shearing means. At the extreme upper end of the mechanism 52 is fixed one member, 53, of a clutch, the other member, 54, of which is slidably mounted on the lower end of the non-cylindrical portion of the shaft 50. Surrounding the tube 48 in the vicinity of the two clutch members is a sleeve, 55, adapted to be moved up and down and carrying fingers, 56, in the form of screws or otherwise which extend through vertical slots, 57, in the tube 48 and project at their inner ends into an annular groove, 58, in the clutch member, 54. By moving the sleeve, 55, up and down the driving connection between the shaft 55 and the mechanism 52 is interrupted or completed at will. If desired, means may be provided for holding the clutch yieldingly in one or both of its two positions. In the arrangement illustrated, I have placed on the sleeve an upwardly-projecting spring finger, 59, having on the upper end a screw or pin, 60, which is adapted to spring on top of or beneath a collar, 61, of proper width fixed about the tube 48. When the pin or screw lies above the collar the shearing means is unclutched from the driving shaft while, when the pin or screw underlies the collar, the two members of the clutch are yieldingly held in operative engagement with each other and the driving connection between the driving shaft and the shearing means is complete.

Figure 7:
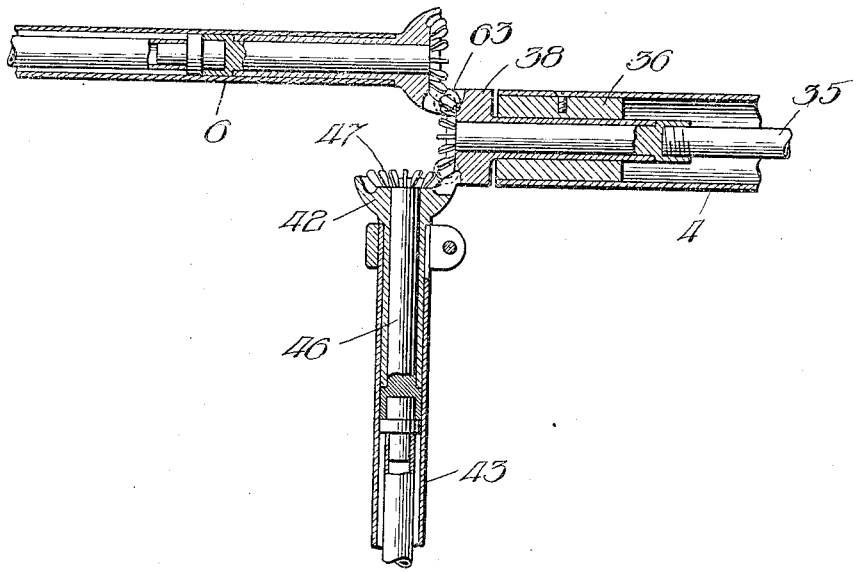
Fig. 7 is a vertical section through the joint between one of the cross arms, a horizontal shaft extension and a drop shaft.

My apparatus is not limited to two drop shafts because it lends itself readily to expansion and contraction to meet the demand of the service. Thus, as heretofore explained, auxiliary horizontal extensions, one of which is indicated at 6, may be provided. Each horizontal extension in turn performs the same function as one of the arms 4 or 5. The lateral extensions are obtained by simply providing the gear housings or casing at the outer ends of the shafts 35 or either of them with an extra hinged connection as indicated at 63 in Figs. 1 and 7 which permits an extension similar to one of the drops to be supported in a horizontal position instead of in a vertical position. Furthermore, just as in the case of the drops, the horizontal extensions may be made collapsible and extensible by means of a suitable expansion joint as indicated at 64 in Fig. 1, so as to permit the additional drops, 65, to be located at any desired distance with respect to the main drops which are supported directly by the cross arms 4 and 5.

Another feature of my invention is best illustrated in Figs. 1 and 8. It consists in mounting a suitable grinding wheel upon the motor or engine which serves as the supporting base for the whole shearing apparatus and as the driving means therefor. To this end I have so formed the frame of the engine or motor as to provide a suitable bearing, 68, for the shaft, 69, on which the grinding wheel is carried; which supporting bearing permits the inner end of the shaft, 69, to extend into the pocket 7 where it is provided with a bevel pinion, 70, meshing with the main driving gear, 29, on the crank shaft. The addition of this grinding device directly to the engine produces a complete outfit in a single self-contained unit. The bearing sleeve, 68, is preferably mounted in such a way that it may be moved in the lengthwise direction to disengage the pinion, 70, from the gear wheel, 29, so as to permit the grinder to stand idle when it is not desired to use the same. This may conveniently be accomplished by supporting the sleeve in such a way that it will be a sliding fit in the frame structure and providing a clamping or holding device, such as the hinged cover plate indicated at 80 for clamping it firmly in place. By loosening the plate 80, the bearing sleeve is freed so that it may be pushed in or out. If desired, the members 68 and 80 may be interlocked in any suitable way so as to prevent the sleeve from turning when the holding plate is loosened.

There is another feature to which I have not heretofore called attention. It is desirable that the shearing devices, indicated as a whole at 71, have capacity for swinging around the axes of the drop shafts by which they are carried. This may conveniently be accomplished by providing a swivel joint between either of the gear casings or housings, 42, at the top or at the bottom of each drop connection. In the arrangement illustrated, and best seen in Fig. 5, I have placed this swivel joint at the lower end of the drop connection. The shank or stem, 72, of the gear casing or housing 42 extends through and is revoluble in a sleeve, 73, which is firmly clamped in the lower end of the tube 48 by means of a clamping band, 74, encircling the split lower end of the latter tube. The universal gear, 47, and the clutch member, 53, on opposite ends of the stub shaft 52 which is revolubly supported in the lower housing or casing 42, serve as stops or shoulders which prevent this casing or housing from moving axially in the sleeve, 72; but they do not prevent the casing or housing from turning freely so as to permit the shearing device, indicated as a whole at 52, from being swung around at will.

It will now be seen that I have produced an extremely simple, compact and flexible apparatus. For the purpose of shipping the apparatus, the main standard is disconnected from the supporting engine or motor without disarranging its telescoping shaft; the arms 4 and 5 with the parts carried thereby may be removed from the sockets in the casting 16; the main standard, the drop connections and the horizontal extensions 6 may all be collapsed so as to make them comparatively short and, with the members 4 and 5, may be formed into a compact bundle which will take up but very little space. Upon receipt of the apparatus, the user needs only slip the members 4 and 5 into their sockets at the top of the standard and secure the standard upon the motor or engine and the apparatus is ready for use; the lengthening or shortening of the standard or of the drop connections or of the lateral extensions being but the work of a moment and adapting the apparatus to the particular conditions existing at the place of its use.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. An apparatus of the character described comprising a motor, having a frame which serves as a supporting base, a hollow standard rigidly supported by and projecting upwardly from the motor frame, hollow cross arms at the upper end of said standard, drop tubes depending from said cross arms, and driving shafting extending from said motor through the standard, the cross arms and the drop tubes.

2. An apparatus of the character described comprising a motor, a hollow standard supported by and projecting upwardly from the motor, hollow cross arms at the upper end of said standard, drop tubes depending from said cross arms, driving shafting extending from said motor through the standard, the cross arms and the drop tubes, and means for varying the height of said standard and of said drop tubes.

3. In an apparatus of the character described, a motor having a frame adapted to serve as a supporting base, a gear mounted on the motor shaft, a hollow standard supported at its lower end only by the motor frame in proximity to the aforesaid gear, the major portion of the standard lying above the top of said frame, a shaft extending through and supported by said standard, and a gear on the lower end of said shaft meshing with the aforesaid gear.

4. In an apparatus of the character described, a motor having a frame adapted to serve as a supporting base, a gear mounted on the motor shaft, a hollow standard supported by and projecting upwardly from the motor frame in proximity to the aforesaid gear, a shaft extending through and supported by said standard, a gear on the lower end of said shaft meshing with the aforesaid gear, cross arms projecting laterally from the upper end of said standard, shafts arranged in said cross arms, and gearing between the shafts and the cross arms and the shaft in the standard.

5. In an apparatus of the character described, a motor, a hollow standard supported by and projecting upwardly from the motor, hollow cross arms at the upper ends of said standard, drop tubes depending from said cross arms, driving shafting extending from said motor through the standard, the cross arms and the drop tubes, and means for adjusting the length of the drop tubes.

6. In an apparatus of the character described, a drop tube hung from its upper end, said tube being made of members telescoping upon each other so as to permit the length of the tube to be varied, a rotatable shaft extending down through the tube, said shaft being extensible to permit it to be lengthened and shortened automatically when the tube is lengthened and shortened, and means at the lower end of the tube for supporting a tool.

7. In an apparatus of the character described, a motor frame, a telescopic hollow standard supported by and projecting upwardly from the motor frame, hollow cross arms at the upper end of said standard, horizontal and vertical tubular extensions hinged to one end of one of said cross arms, rotatable shafts within said extensions, rotatable shafts within said cross arms, universal gearing between the shafts in the extensions and the corresponding cross arm shaft, and a telescoping driving shaft extending through said standard from the motor to the cross arms.

8. In an apparatus of the character described, a motor, a telescopic hollow standard supported by and projecting upwardly from the motor frame, hollow cross arms at the upper end of said standard, horizontal and vertical tubular extensions hinged to one end of one of said cross arms, rotatable shafts within said extensions, rotatable shafts within said cross arms, universal gearing between the shafts and the extensions and the corresponding cross arm shaft, a telescoping driving shaft extending through said standard from the motor to the cross arms, the aforesaid horizontal extension and its shaft being telescopic.

9. In an apparatus of the character described, a motor, a telescopic hollow standard supported by and projecting upwardly from the motor frame, hollow cross arms at the upper end of said standard, horizontal and vertical tubular extensions hinged to one end of one of said cross arms, rotatable shafts within said extensions, rotatable shafts within said cross arms, universal gearing between the shafts in the extensions and the corresponding cross arm shaft, a telescoping driving shaft extending through said standard from the motor to the cross arms, the aforesaid horizontal extension and its shaft being telescopic, a drop shaft and inclosing tube depending from said horizontal extension and universal gearing between the latter shaft and the shaft in said extension.

10. In an apparatus of the character described, a motor and its shaft, the frame of the motor having formed therein an open-top pocket through which said shaft passes, power driven apparatus including a standard secured at its lower end in the upper end of said pocket, a shaft arranged within said standard and projecting downwardly into said pocket, and complementary gears secured to said shafts within the pocket and forming a driving connection between the motor shaft and the shaft in the standard.

11. In an apparatus of the character described comprising a motor containing a pocket open at the top, a driving gear in said pocket, a tubular standard, a shaft extending through said standard and having a gear at each end, means for clamping the lower end of said standard in said pocket with the corresponding gear meshing with the driving gear, a tubular cross arm, a shaft extending through said cross arm, a gear wheel on the latter shaft at each end of said cross arm, means for clamping said cross arm to the upper end of said standard with the adjacent gears in mesh with each other, a drop connection depending from the outer end of said cross arm, said drop connection having a gear meshing with the corresponding gear on the cross arm.

12. An apparatus of the character described comprising a motor having a frame which serves as a supporting base, a standard rigidly connected at its lower end to said frame and projecting upwardly therefrom, hollow cross arms at the upper end of said standard, drop tubes depending from said cross arms, shafting extending through said cross arms and through the drop tubes, and a driving connection between said motor and said shafting.

13. An apparatus of the character described comprising a motor having a frame which serves as a supporting base, a standard rigidly connected at its lower end to said frame and projecting upwardly therefrom, hollow cross arms at the upper end of said standard, drop tubes depending from said cross arms, shafting extending through said cross arms and through said drop tubes, a driving connection between said motor and said shafting, and means for varying the height of said standard and of said drop tubes.

In testimony whereof, I sign this specification.

GUSTAV A. GILBERTSON.

Copies of this patent may be obtained for five cents each, by addressing the " Commissioner of Patents, Washington, D. C."